United States Patent [19]
Haughian

[11] Patent Number: 5,598,682
[45] Date of Patent: Feb. 4, 1997

[54] PIPE RETAINING CLIP AND METHOD FOR INSTALLING RADIANT HEAT FLOORING

[75] Inventor: Daniel J. Haughian, Mission, Canada

[73] Assignee: Haughian Sales Ltd., Mission, Canada

[21] Appl. No.: 212,799

[22] Filed: Mar. 15, 1994

[51] Int. Cl.$^6$ ............................. E04C 5/16; F24D 13/02
[52] U.S. Cl. ................ 52/745.21; 52/220.3; 52/684; 52/712; 52/719; 403/346; 403/400
[58] Field of Search ..................... 52/220.1, 220.3, 52/677, 684, 712, 719, 745.21; 403/400, 387, 384, 346; 24/459

[56] References Cited

U.S. PATENT DOCUMENTS

| | | |
|---|---|---|
| 191,881 | 7/1919 | Thomas . |
| 222,194 | 8/1922 | Dunbar . |
| 228,661 | 2/1923 | Cole . |
| 977,704 | 12/1910 | Brownlee ........................ 403/400 |
| 1,263,887 | 4/1918 | Hamilton ........................ 52/719 |
| 1,304,815 | 5/1919 | Sharp ........................ 52/712 |
| 1,306,984 | 6/1919 | White ........................ 52/684 |
| 1,824,315 | 9/1931 | White ........................ 52/745.21 X |
| 1,986,528 | 1/1935 | Ranger ........................ 52/719 |
| 1,999,508 | 4/1935 | Mathews ........................ 52/719 |
| 2,469,963 | 5/1949 | Grosjean et al. ........................ 52/220.1 X |
| 2,843,230 | 7/1958 | Nelsson ........................ 52/719 X |
| 3,004,370 | 10/1961 | Tinnerman ........................ 52/719 |
| 3,055,686 | 9/1962 | Havener ........................ 403/387 |
| 3,187,854 | 6/1965 | Lydard ........................ 403/387 |
| 3,430,912 | 3/1969 | Davis et al. ........................ 52/712 |
| 3,797,193 | 3/1974 | Haller et al. . |
| 3,806,994 | 4/1974 | Lankford ........................ 52/719 X |
| 4,318,262 | 3/1982 | Uehara . |
| 4,878,332 | 11/1989 | Drake . |

FOREIGN PATENT DOCUMENTS

| | | |
|---|---|---|
| 324872 | 8/1932 | Canada . |
| 529545 | 8/1956 | Canada . |
| 107558 | 5/1984 | European Pat. Off. ............... 52/220.1 |
| 560707 | 9/1993 | European Pat. Off. ................. 52/719 |
| 1255893 | 12/1967 | Germany .............................. 52/713 |
| 3120045 | 12/1982 | Germany .............................. 52/220.1 |
| 3212699 | 10/1983 | Germany .............................. 52/220.1 |
| 6-57964 | 3/1994 | Japan .................................... 52/220.1 |
| 13369 | of 1896 | United Kingdom ................. 403/400 |
| 253188 | 6/1926 | United Kingdom ................. 403/400 |
| 445937 | 4/1936 | United Kingdom ................. 52/220.1 |
| 775566 | 5/1957 | United Kingdom ................. 403/400 |

OTHER PUBLICATIONS

"Caddy Conduit Box Clips", ERICO Products Catalog, Cleveland Ohio 1973.
"Caddy HRL Bridging Clips", ERICO Products Catalog, Cleveland Ohio, p. 28 1973.

*Primary Examiner*—Wynn E. Wood
*Assistant Examiner*—Laura A. Saladino
*Attorney, Agent, or Firm*—Oyen Wiggs Green & Mutala

[57] ABSTRACT

Retaining clips are provided by the present invention for use in a novel method of constructing radiant heat flooring. The clips are used to secure heating pipe that has been laid on top of a wire grid. The pipe is secured by attaching the retaining clip to the wire grid so that the retaining clip passes from one point of attachment on the wire grid, over the pipe, to another point of attachment on the grid, without passing beneath the grid or the pipe.

15 Claims, 3 Drawing Sheets

5,598,682

PIPE RETAINING CLIP AND METHOD FOR INSTALLING RADIANT HEAT FLOORING

FIELD OF THE INVENTION

The present invention is in the field of radiant heat flooring. More specifically, the invention relates to an improved method for securing heating pipe to a wire grid as part of the process of installing radiant heat flooring. A new pipe retaining clip has been invented for this purpose.

BACKGROUND OF THE INVENTION

Radiant heat flooring is commonly constructed by providing concrete floors with integral hot water pipes. When hot water is circulated through the pipes, warmth is provided to the interior spaces of the structure through the concrete floor.

In a typical process for constructing radiant heat flooring, a steel wire grid is laid on a foundation of tamped gravel and sand. Water piping is then laid down in a zig-zag array over top of the wire grid, so that the pipe is parallel to some of the wires and perpendicular to others. The water pipe is then secured to the wire grid. Once the water pipe is secured to the wire grid, concrete is poured over and around the water pipe and steel grid. The concrete is allowed to set to form a concrete floor with integral hot water pipes.

In the process of constructing radiant heat flooring, the step of securing the water pipe to the wire grid is important, normally very time consuming and labour intensive. The water pipe must be secured to the grid to hold the pipe in place and prevent it from moving or "floating" when the concrete flooring material is poured over the pipe.

A number of methods have been used in the construction of radiant heat flooring to secure the water pipe to the steel grid. Various kinds of twist ties and tie wraps are commonly used to attach the pipe to the wire grid at points where the pipe crosses a wire. These prior art methods and devices are awkward and hence extremely time consuming to use. At each point of attachment, an installer must bend or kneel down and thread a tie beneath the wire and around the pipe before being securing it into place. There is a strong need for more efficient methods and improved devices for securing water pipe to wire grids in the installation of radiant heat concrete floors.

SUMMARY OF THE INVENTION

The present invention provides methods and devices whereby the pipe in a radiant heat flooring installation can be readily attached to a wire grid by using clips that are particularly easy to attach. The ease of attachment of the clips of the invention derives from their adaptation to engage the wire grid from above, trapping the pipe beneath the clip. In using the method and devices of the invention, there is no need for the installer to pass the clip beneath the wire grid. This is important, because the space beneath the grid is typically restricted and is not easily accessed. Since a typical radiant heat flooring installation includes many hundreds or thousands of such clips, the incremental advantage provided by the present invention greatly increases the efficiency of constructing the installation, and lowers cost.

Radiant heat flooring is typically installed according to the following method:

1. place a wire grid on a foundation;
2. place a spaced apart array of heating pipe on top of the wire grid;
3. secure the heating pipe to the wire grid;
4. surround the wire grid, heating pipe and retaining clip with fluid hardenable flooring material; and,
5. allow the flooring material to harden.

Novelty in the invention involves the step of securing the heating pipe to the wire grid by attaching a retaining clip to segments of wire in the wire grid. The retaining clip is attached so that it passes over a segment of the heating pipe to another point of attachment on another segment of wire in the wire grid, without passing under the pipe. The present invention contemplates at least two specific methods of securing the heating pipe to the wire grid.

The heating pipe may be secured to the wire grid by attaching a retaining clip to the wire grid so that the retaining clip passes directly from a first point of attachment on a first segment of wire, over a segment of the heating pipe, to another point of attachment on a second proximal segment of said wire. The segments of wire being generally perpendicular to the segment of the pipe.

Alternatively, the heating pipe may be secured to the wire grid by attaching a retaining clip to the wire grid so that the retaining clip passes, generally horizontally, from a first point of attachment on a first segment of wire, over a segment of the heating pipe, to another point of attachment on a second segment of wire that is distal from, and generally parallel to, the first segment of wire, the segments of wire being generally parallel to the segment of the pipe.

The flooring material used in the method of the present invention is preferably concrete, which is allowed to set to harden, the wire grid is generally made of steel and the heating pipe is usually made of plastic, such as polybutylene. The retaining clip used to hold the pipe to the wire grid preferably includes two flexibly connected clasps for releasably engaging wires of the wire grid. Alternative embodiments of the clips provided by the present invention for use in the method of the invention are described below.

In one embodiment, the retaining clip of the invention is essentially a flat resiliently flexible strip of material with an integral clasp at opposite ends of the strip. The clasps are adapted to form axial catches for segments of wire in the wire grid. To engage the wire, the clasps preferably include a circular hole proximal to the end of the strip, with a cut in the strip between the hole and the end of the strip. The cut is to allow the wire to pass into engagement in the hole. The cut may be offset from the portion of the hole closest to the end of the strip. This offset moves the cut away from the portion of the hole against which the pipe is most likely to bear when the pipe is held by the clasp. As a result, with the cut offset, the pipe is more reliably held by the clasp because the pipe can not as easily slip back through the cut. The clip may also be notched where the cut meets the end of the strip. The notch provides an improved point of entry for the wire to the cut. When the wire is placed in the notch and the clasp is forced against the wire, the wire is forced through the cut into engagement with the hole in the clasp. In use, the strip can be positioned over top of a pipe and the ends of the strip pressed down into engagement with segments of the wire, thereby fastening the pipe to the wire.

An alternative embodiment of the retaining clip is provided by the present invention. In the alternative embodiment, the retaining clip includes two clasps, each defining a transverse pocket, the pocket forming an axial catch for segments of the wire in the wire grid. The clasps are connected by a length of flexible material. The flexible material connecting the clasps may include an intermediate portion defining a transverse arcuate groove forming an axial guide for the pipe. The segments of pipe and wire engaged by the clip are generally perpendicular to the clip.

In the alternative embodiment of the retaining clip of the present invention, each clasp has an upper and a lower jaw portion connected by a resiliently flexible portion which functions as a joint between the generally more rigid jaw portions. A handle may be rigidly connected to the upper jaw portion of each clasp so that the handle may be used to manipulate the clasps. The rigid attachment of the handle to the upper jaw portion of the clasp makes it possible to use the handle to clip the clasp into position on the wire. When the clasp is attached to the wire, the wire is generally perpendicular to the clip and occupies the transverse pocket in the clasp. To ensure a tight fit between the transverse pocket and a cylindrical wire, the pocket can be arcuate, defining something like 270 degrees of arc, so that the wire is confined by the pocket. The clip may be made from plastic or rubber having sufficient flexibility and resiliency to allow the clip to be manipulated into place over the pipe and clipped onto the wire.

The wire grids used in the construction of radiant heat flooring are generally made with each of the parallel wires being 6 inches apart, forming a grid of 6 inch squares. Accordingly, in the alternative embodiment of the retaining clip which is designed to span two parallel strands of wire, the distance between the transverse pockets of the clasps will preferably be just sufficient to span this width and trap the pipe beneath the clip.

BRIEF DESCRIPTION OF THE DRAWINGS

The invention, as exemplified by preferred embodiments, is described with reference to the drawings in which.

DETAILED DESCRIPTION OF SPECIFIC EMBODIMENTS OF THE INVENTION

Figure 1:
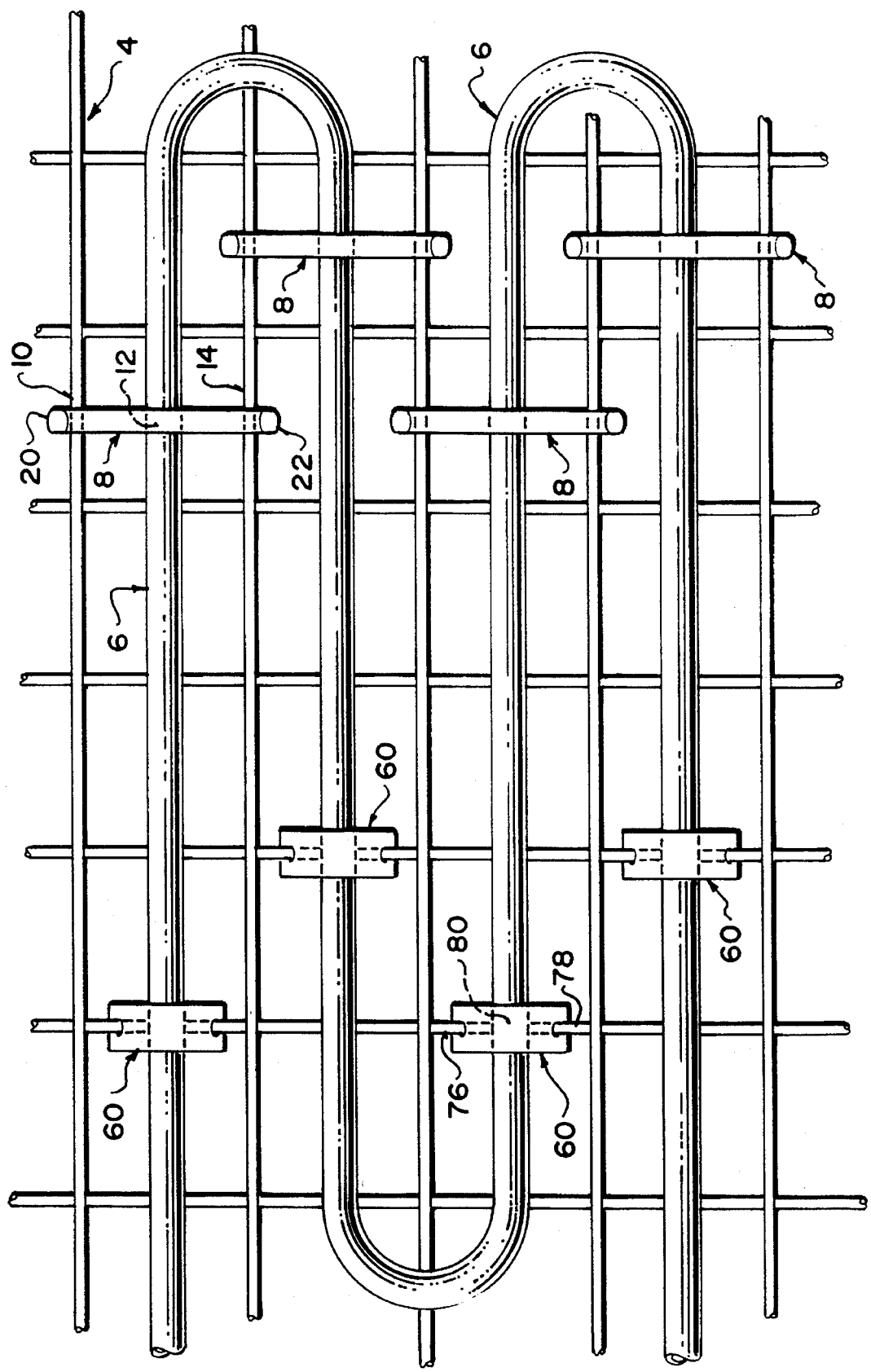
FIG. 1 is a top plan view of a radiant heat flooring installation showing two different embodiments of the retaining clips of the invention in place.

Referring to the drawings, and FIG. 1 in particular, which illustrates a radiant heat flooring installation showing two different embodiments of the retaining clips of the invention in place, the invention provides a method of constructing radiant heat flooring which includes the following steps:

1. place a wire grid 4 on a generally flat foundation, the foundation typically being tamped sand and gravel;
2. place a spaced apart array of heating pipe 6 superposed over the wire grid 4, the heating pipe 6 typically being made plastic such as polybutylene;
3. secure the heating pipe 6 to the wire 4 of the grid by attaching a preferred embodiment of a retaining clip 60 to the wire 4 of the grid so that the retaining clip 60 passes directly from a first point of attachment on a first segment of wire 76, over a segment of the heating pipe 6, to another point of attachment on a second proximal segment of said wire 78, the segments of the wire 76, 78 being generally perpendicular to the segment of the pipe 6;
4. surrounding the wire grid 4, heating pipe 6 and retaining clip 8 with fluid hardenable flooring material, such as concrete; and,
5. hardening or setting the flooring material.

FIG. 1 illustrates several retaining clips 60 arranged in a pattern on the left-hand side of the radiant heat flooring installation shown in that Figure. This is illustrative of the fact that the array of clips 60 effectively holds the pipe 6 on the grid 4.

In an alternative step to #3 above, the present invention contemplates securing the heating pipe 6 to the wire grid 4 by attaching an alternative embodiment of retaining clip 8 to the wire 4 of the grid so that the retaining clip 8 passes, generally horizontally, from a first point of attachment on a first segment of wire 10, over a segment of the heating pipe 6, to another point of attachment on a second segment of wire 14 that is distal from, and generally parallel to, the first segment of wire 10, the segments of wire 10, 14 being generally parallel to the segment of the pipe 6.

Figure 2:
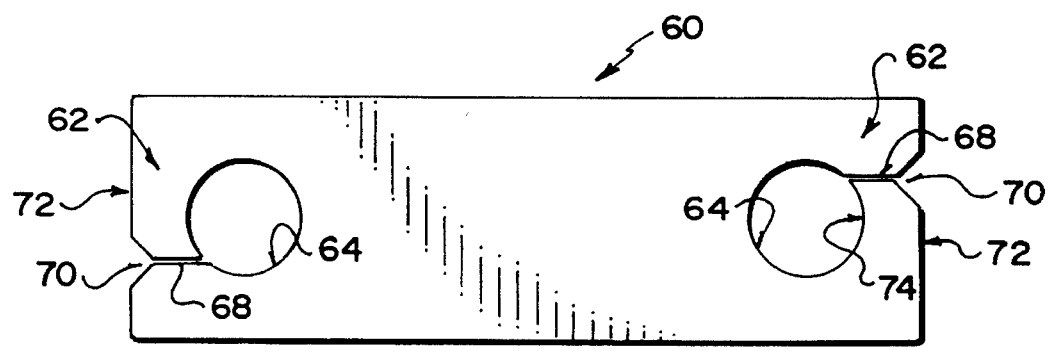
FIG. 2 is a plan view of a preferred embodiment of a retaining clip of the invention.
Figure 3:
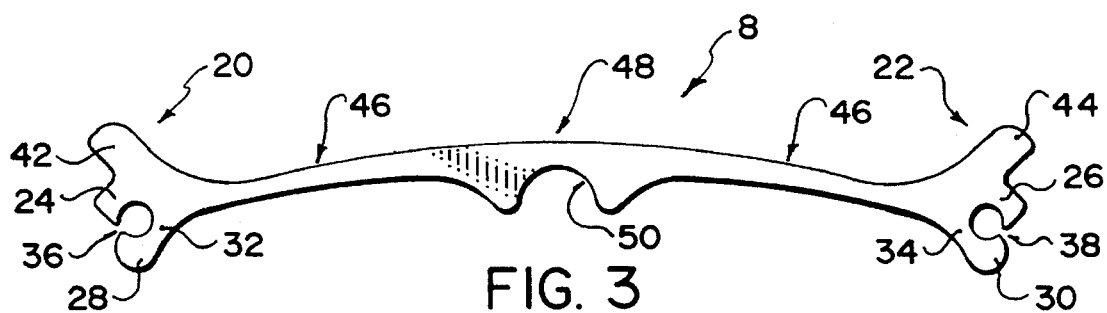
FIG. 3 is a side view of an alternative embodiment of a retaining clip of the invention.
Figure 5:
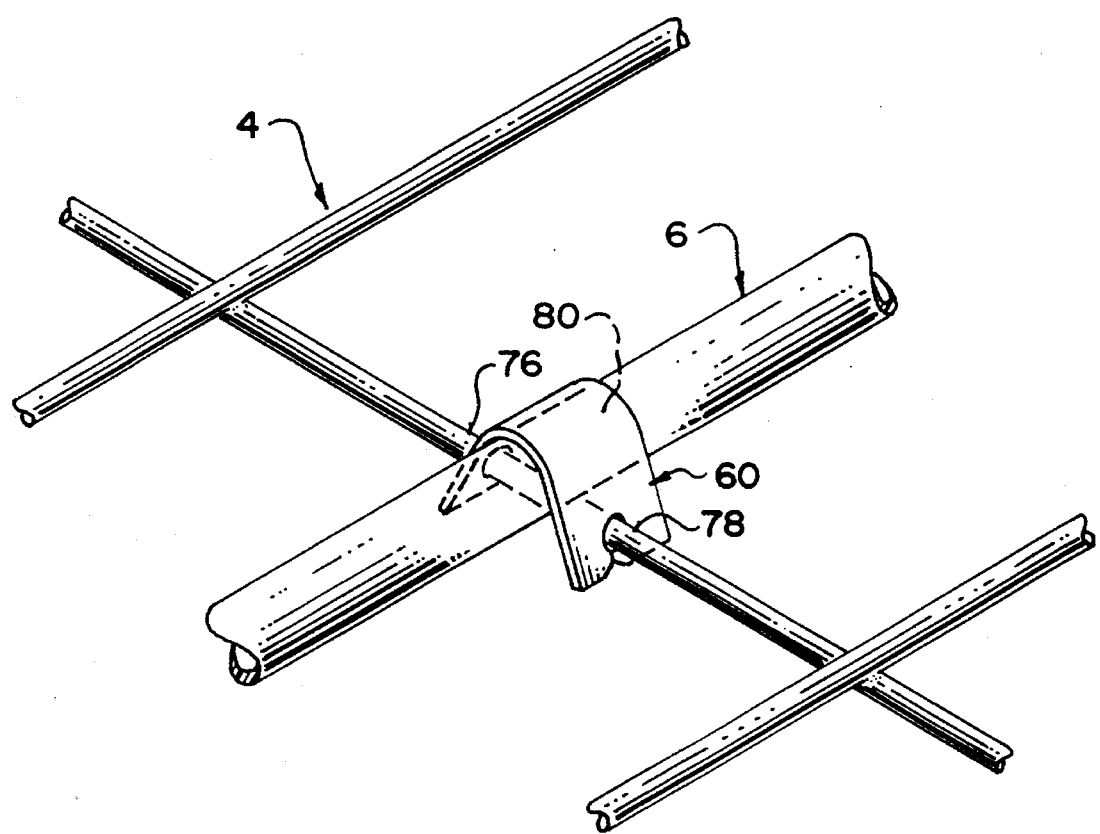
FIG. 5 is a partially fragmented isometric view of the retaining clip of FIG. 2, showing the clip in use holding a pipe in place on a wire grid in a radiant heat flooring installation.

In a preferred embodiment, as seen in plan view in FIG. 2, the retaining clip 60 of the invention is essentially a flat resiliently flexible strip of material, such as high density polyvinyl chloride, polyethylene or polypropylene. The retaining clip 60 has integral clasps 62 at opposite ends, the clasps 62 being adapted to form axial catches for segments 76, 78 of the wire grid 4. To engage the wire, each of the clasps 62 has a circular hole 64 proximal to the opposite ends 72 of the retaining clip 60, with cuts 68 in the retaining clip 60 between the holes 64 and the ends 72 of the retaining clip 60. The cuts 68 are to allow segments of the wire 76, 78 to pass into engagement in the holes 64. The cuts 68 are offset from the portions 74 of the holes 64 closest to the ends 72 of the retaining clip 60. The clip is provided with notches. 70 where the cuts 68 meet the ends 72 of the retaining clip 60. The notches 70 provide an improved point of entry for the segments of wire 76, 78 to the cuts 68. When the segments of wire 76, 78 are placed in the notches 70 and the clasps 62 are forced down over a segment of pipe 80 against the segments of wire 76, 78, the segments of wire 76, 78 are forced through the cuts 68 into engagement with the holes 64 in the clasps 62. FIG. 5 is a partially fragmented isometric view of the preferred retaining clip 60, showing the retaining clip 60 in use holding a pipe 6 in place on a wire grid 4 in a radiant heat flooring installation.

The resiliency of the retaining clip 60, determined by the resiliency and thickness of the material of which it is made, is preferably such that when it is in place it exerts sufficient pressure against the secured pipe 6 so that the pipe 6 can not easily be moved. At the same time, the retaining clip 60 should be flexible enough that it may be easily bent into position over the pipe 6 into engagement with the wire grid 4.

In an alternative embodiment, the retaining clip 8 may be made from plastic, such as polyethylene, or rubber material and has two clasps 20, 22, each having an upper 24, 26 and a lower 28, 30 jaw portion connected by a resiliently flexible joint portion 32, 34. The jaw and joint portions together defining arcuate transverse pockets 36, 38 that form axial catches for segments of the wire 10, 14 in the wire grid 4. The segments of wire 10, 14 being generally perpendicular to the clip 8. Handles 42, 44 are rigidly connected to the upper jaw portions 24, 26 of each clasp 20, 22. A length of flexible material 46 connects the clasps 20, 22. The length of flexible material 46 including an intermediate portion 48 defining an arcuate transverse groove 50 forming an axial guide for a segment of the pipe 12. The segment of pipe 12 being generally perpendicular to the clip 8.

Figure 4:
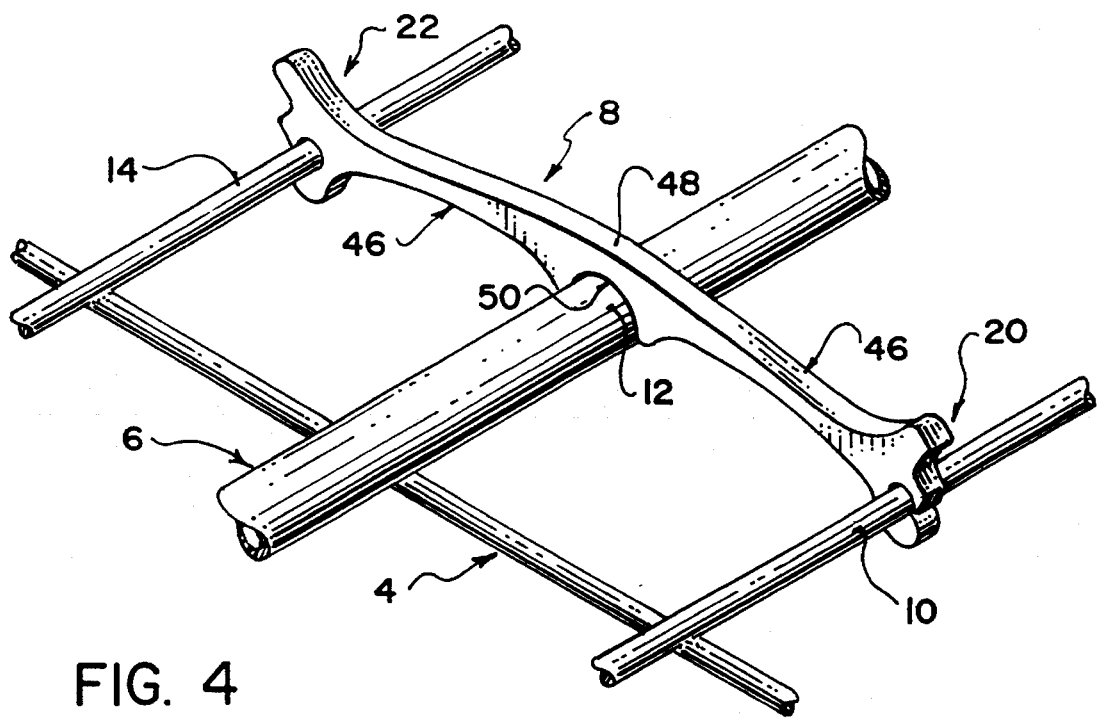
FIG. 4 is a partially fragmented isometric view of the retaining clip of FIG. 3, showing the clip in use holding a pipe in place on a wire grid in a radiant heat flooring installation.

FIG. 4 illustrates the retaining clip 8 of the invention, showing the retaining clip 8 in use holding a pipe 6 in place on a wire grid 4 in a radiant heat flooring installation. The retaining clip 8 of the invention is used in the method of the invention at the step of securing the heating pipe 6 to the wire grid 4. In use, one of the handles 42 may be held in the hand by an installer and used to manipulate one of the upper jaw portions 24 into place above the first segment of wire 10, thereby forcing the segment of wire 10 into one of the arcuate transverse pockets 38, with the result that one of the clasps 22 is clipped into position on the wire grid 4. The other handle 44 of the retaining clip 8 is then used to direct the intermediate portion 48 of the clip 8 into position over the underlying segment of pipe 12 so that the arcuate transverse groove 50 rests against the segment of pipe 12 forming an axial guide for the pipe 6. Finally, the second of the two clasps 20 is clipped into position on the second segment of wire 14, in a repeat process of that used to clip the first of the two clasps 22 into place. It will be obvious to those skilled in the art that the clasps 20, 22 may be clipped into position simultaneously.

As will be apparent to those skilled in the art in the light of the foregoing disclosure, many alterations and modifications are possible in the practice of this invention without departing from the spirit or scope thereof. For example, the retaining clips of the invention may be usefully adapted for securing electrical conduit, cable, and other types of piping to the wire grid, or to reinforcing bar, in a radiant heat flooring installation. Accordingly, the scope of the invention is to be construed in accordance with the substance defined by the following claims.

What is claimed is:

1. A method of securing an elongate member to an elongate support comprising:

a) laying an elongate member on an elongate support so that a segment of the elongate member lies generally transversely over a segment of the elongate support;

b) providing a retaining clip comprising a generally planar resiliently flexible strip defining two holes, one hole proximal to each opposing end of the retaining clip, the retaining clip having two cuts, one cut in each opposing end of the retaining clip, the cuts being between the holes aria the opposing ends of the retaining clip, forming an intersection between the cut and the hole on each opposing end of the retaining clip;

c) bending the retaining clip partially around the segment of the elongate member so that the opposing ends of the retaining clip are biased out of the plane of the retaining clip, with one of the opposing ends of the retaining clip on one side of the elongate member and the other opposing end of the retaining clip on the other side of the elongate member;

d) applying force to the opposing ends of the retaining clip to bias the opposing ends of the retaining clip down against the segment of the elongate support, to pass the segment of the elongate support through the cuts into the holes and to allow the cuts resiliently close; and, e) releasing the force applied to the opposing ends of the retaining clip to allow the holes to form axial caches for the segment of the elongate support.

2. The method of claim 1 wherein in step (d), the elongate support is passed into the holes at the intersections between the cuts and the holes, the intersection being offset from the portions of the holes closest to the opposing ends of the retaining clip, further comprising the step after step (e), of positioning the clip so that the segment of the elongate support does not bear against the intersections of the cuts with the holes.

3. The method of claim 2 wherein the retaining clip is notched where each cut meets each of the opposing ends of the retaining clip and further comprising the step, before step (d), of positioning the retaining clip so that the segment of the elongate support rests against the notches when the opposing ends of the retaining clip are biased down against the segment of the elongate support, thereby aligning the segment of the elongated support with the cuts.

4. The method of claim 1, further comprising the step of placing the retaining clip generally transversely on the elongate member before step (c), wherein, in step (c), the elongate member is used as a fulcrum for bending the retaining clip.

5. The method of claim 4 wherein the steps of securing the elongate member to the elongate support are carried out manually and the retaining clip is sufficiently flexible to allow manual manipulation.

6. A method of securing a heating pipe to a support wire in a radiant heat flooring installation comprising:

a) lying a heating pipe in a wire so that a segment of the heating pipe lies generally transversely over a segment of the wire;

b) providing a retaining clip comprising a generally planar resiliently flexible strip having two holes, one hole proximal to each opposing end of the retaining clip, the retaining clip having two cuts, one cut in each opposing end of the retaining clip, the cuts being between the holes and the opposing ends of the retaining clip, forming an intersection between the cut and the hole on each opposing end of the retaining clip;

c) bending the retaining clip partially around the segment of the heating pipe so that the opposing ends of the retaining clip are biased out of the plane of the retaining clip, with one of the opposing ends of the retaining clip on one side of the heating pipe and the other opposing end of he retaining clip on the other side of the heating pipe and, d) applying force to the opposing ends of the retaining clip to bias the opposing ends of the retaining clip don against the segment of the wire, to pass the segment of the wire through the cuts to the holes and to allow the cuts to resiliently close; and, e) releasing the force applied to the opposing ends of the retaining clip to allow the holes to form axial caches for the segment of the wire.

7. The method of claim 6 wherein in step (d), the segment of the wire is passed into the holes at the intersections between the cuts and the holes, the intersections being offset from the portions of the holes closest to the opposing ends of the retaining clip, further comprising the step after step (e), of positioning the clip so that the segment of the wire does not bear against the intersections of the cuts with the holes.

8. The method of claim 7 wherein the retaining clip is notched here each cut meets each of the opposing ends of the retaining clip and further comprising the step, before step (d), of positioning the retaining clip so that the segment of the wire rests against the notches before the opposing ends of the retaining clip are biased down against the segment of the wire, thereby aligning the segment of the wire with the cuts.

9. The method of claim 6, further comprising the step of placing the retaining clip generally transversely on the heating pipe before step (c), wherein, in step (c), the heating pipe is used as a fulcrum for bending the retaining clip.

10. The method of claim 9 wherein the steps of securing the heating pipe to the wire are carried out manually and the retaining clip is sufficiently flexible to allow manual manipulation.

11. In an improved method of constructing radiant heat flooring comprising the steps of:

a) placing a wire grid on a foundation;

b) placing a spaced apart array of heating pipe over the wire grid so that a segment of the heating pipe lies generally transversely over a segment of the wire grid;

c) securing the heating pipe to the wire grid d) surrounding the wire grid, heating pipe and retaining clip with fluid, hardenable flooring material; and, e) hardening the flooring material;

the improvement comprising, at the step of securing the heating pipe to the wire grid, the steps of:

i) laying a heating pipe on a wire grid so that a segment of the heating pipe lies generally transversely over a segment of the wire grid;

ii) providing a retaining clip comprising a generally planar resiliently flexible strip having two holes, one hole proximal to each opposing end of the retaining clip, the retaining clip having, two cuts, one cut in each opposing end of the retaining clip, the cuts between the holes and the opposing ends of the retaining clip, forming an intersection between the cut and the hole on each opposing end of the retaining clip;

iii) bending the retaining clip partially around the segment of the heating pipe so that the opposing ends of the retaining clip are biased out of the plane of the retaining clip, with one of the opposing ends of the retaining clip on one side of the heating pipe and the other opposing end of the retaining clip on the other side of the heating pipe; and, iv) applying force to the opposing ends of the retaining clip to bias the opposing ends of the retaining clip down against the segment of the wire grid, to pass the segment of the wire grid through the cuts into the holes and to allow the cuts to resiliently close; and, v) releasing the force applied to the opposing ends of the retaining clip to allow the holes to form axial caches for the segment of the wire grid.

12. The method of claim 11 wherein in step (iv), the segment of the wire grid is passed into the holes at the intersections between the cuts and the holes, the intersections being offset from the portions of the holes closest to the opposing ends of the retaining clip, futher comprising the step after step (v), of positioning the clip so that the segment of the wire grid does not bear against the intersections of the cuts with the holes.

13. The method of claim 12 wherein the retaining clip is notched where each cut meets each of the opposing ends of the retaining clip and further comprising the step, before step (iv), of positioning the retaining clip so that the segment of the wire grid rests against the notches before the opposing ends of the retaining clip are biased down against the segment of the wire grid, thereby aligning the segment of the wire grid with the cuts.

14. The method of claim 11, further comprising the step of placing the retaining clip generally transversely on the heating pipe before step (iii), wherein, in step (iii), the heating pipe is used as a fulcrum for bending the retaining clip.

15. The method of claim 14 wherein the steps of securing the heating pipe to the wire grid are carried out manually and the retaining clip is sufficiently flexible to allow manual manipulation.

* * * * *